(12) United States Patent
Yamamoto et al.

(10) Patent No.: US 9,715,042 B2
(45) Date of Patent: Jul. 25, 2017

(54) LIGHT-SHIELDING COATING MATERIAL AND LIGHT-SHIELDING FILM FOR OPTICAL ELEMENT AND OPTICAL ELEMENT

(71) Applicant: CANON KABUSHIKI KAISHA, Tokyo (JP)

(72) Inventors: Shuhei Yamamoto, Tokyo (JP); Katsumoto Hosokawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 14/379,085

(22) PCT Filed: Feb. 12, 2013

(86) PCT No.: PCT/JP2013/054056
§ 371 (c)(1),
(2) Date: Aug. 15, 2014

(87) PCT Pub. No.: WO2013/125544
PCT Pub. Date: Aug. 29, 2013

(65) Prior Publication Data
US 2015/0022894 A1    Jan. 22, 2015

(30) Foreign Application Priority Data

Feb. 20, 2012    (JP) ................................ 2012-034379

(51) Int. Cl.
*G02B 1/10*    (2015.01)
*G02B 5/00*    (2006.01)
(Continued)

(52) U.S. Cl.
CPC .............. *G02B 1/10* (2013.01); *C08G 59/50* (2013.01); *C09D 5/32* (2013.01); *C09D 7/1266* (2013.01);
(Continued)

(58) Field of Classification Search
CPC .. G02B 1/10; G02B 1/11; G02B 1/111; G02B 1/14; G02B 5/003; G02B 5/206;
(Continued)

(56) References Cited

U.S. PATENT DOCUMENTS 6,129,980 A * 10/2000 Tsukada .................. G02B 1/111
313/479
2011/0014383 A1* 1/2011 Maslow ................ C08G 59/56
427/386
2011/0200810 A1* 8/2011 Kubota .................... G02B 1/04
428/220

FOREIGN PATENT DOCUMENTS

JP        47-032419 B      8/1972
JP        2006-343445 A   12/2006
(Continued)

*Primary Examiner* — Kimberly N Kakalec
(74) *Attorney, Agent, or Firm* — Canon U.S.A. Inc., IP Division

(57) ABSTRACT

To provide a light-shielding film for optical element having durability under high temperature and high humidity conditions and resistance to a cleaning liquid.

A light-shielding coating film for optical element containing: a cured substance at least containing an epoxy resin, titania fine particles, a dye, and an amine curing agent, in which the equivalent ratio (A/E) of the active hydrogen equivalent weight (A) of the amine curing agent and the epoxy equivalent weight (E) of the epoxy resin and the compounding ratio (A'/E') of the amine curing agent amount (A') and the epoxy resin amount (E') satisfy the following expression 1, $$1.1 \leq (A'/E')/(A/E) \leq 1.7.$$    (Expression 1)

5 Claims, 1 Drawing Sheet

(51) Int. Cl.
  *G02B 27/00*  (2006.01)
  *C09D 5/32*  (2006.01)
  *C09D 7/12*  (2006.01)
  *C08G 59/50*  (2006.01)
  *C09D 163/00*  (2006.01)
  *C08K 3/22*  (2006.01)

(52) U.S. Cl.
  CPC ............ *C09D 163/00* (2013.01); *G02B 5/003* (2013.01); *G02B 27/0018* (2013.01); *C08K 2003/2241* (2013.01)

(58) Field of Classification Search
  CPC .......... G02B 5/208; G02B 5/22; G02B 5/223; G02B 27/0018; C08G 59/50; C08G 59/5006; C09D 163/00; C09D 5/32; C09D 7/1266; C08K 2003/2241
  See application file for complete search history.

(56) References Cited

FOREIGN PATENT DOCUMENTS

| | | |
|---|---|---|
| JP | 2009-145884 A | 7/2009 |
| JP | 2011-164494 A | 8/2011 |

* cited by examiner

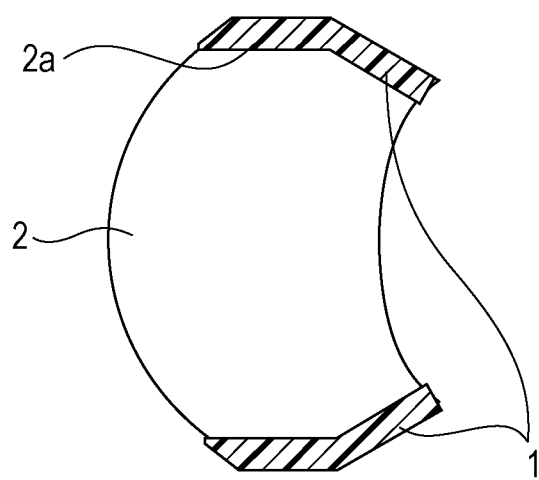

LIGHT-SHIELDING COATING MATERIAL AND LIGHT-SHIELDING FILM FOR OPTICAL ELEMENT AND OPTICAL ELEMENT

TECHNICAL FIELD

The present invention relates to a light-shielding coating material and a light-shielding film for optical element and an optical element provided with the light-shielding film. In particular, the invention relates to a light-shielding coating material for optical element at least containing an epoxy resin, titania fine particles, a dye, and an amine curing agent and a light-shielding film thereof.

BACKGROUND ART

Heretofore, optical elements for use in optical apparatuses, such as a camera, binoculars, a microscope, a semiconductor, and a liquid crystal exposure apparatus, have been provided with a black light-shielding film disposed as required to a region other than an optically effective area for reducing stray light. The stray light reaching a rim portion and the like of a lens is sufficiently absorbed by the light-shielding film, so that unnecessary light, such as flare and ghost, is reduced.

The light-shielding film is expected to have an effect of reducing stray light entering the light-shielding film from the inside of the optical element, and is demanded to suitably reduce reflected light referred to as inner reflection.

With a reduction in size and an increase in performance of optical apparatuses in recent years, materials with a higher refractive index have been used for optical elements for use in the optical system. In order to reduce internally reflected light, the refractive indices of the light-shielding film and a lens need to be approximated. Then, a method is known which introduces a component with a high refractive index into the light-shielding film to thereby suitably control the refractive index of the light-shielding film.

PTL 1 discloses a light-shielding film for optical element in which the refractive index is increased by the use of coal tar and internally reflected light is reduced by absorbing light by coal tar, carbon black, and a dye. Moreover, PTL 2 discloses a light-shielding film for optical element in which the refractive index is increased by the use of non-black inorganic fine particles and internally reflected light is reduced by absorbing light by a dye.

The light-shielding film is also required to have, in addition to the effect of reducing internally reflected light described above, durability under high temperature and high humidity conditions and resistance to a cleaning liquid, such as an organic solvent, to be used in a cleaning process of the optical element after the formation of the light-shielding film. In particular, a light-shielding film provided on the peripheral portion of a cemented lens in which glass lenses are cemented to each other is required to be heat treated at a temperature lower than the temperature of a single lens to be cured in order to prevent the separation of the interface of a bonding resin and the glass lenses due to a thermal expansion difference of the bonding resin and the glass lenses.

CITATION LIST

Patent Literature

PTL 1 Japanese Patent Publication No. 47-32419
PTL 2 Japanese Patent Laid-Open No. 2011-164494

SUMMARY OF INVENTION

Technical Problem

However, when coal tar is used as a refractive-index adjustment agent as in PTL 1, an increase in refractive index is limited. For example, there are a problem such that it easily becomes difficult to suitably reduce the inner reflectance of an optical element using a glass material having a high refractive index and a problem such that a light-shielding film is easily separated under high temperature and high humidity conditions in a cemented lens.

In the case of an anti-internal reflection coating material containing non-black inorganic fine particles with a higher refractive index as in PTL 2, the refractive index can be adjusted to a desired value in such a manner as to be widely applicable to glass materials with high refractive indices from glass materials with low refractive indices. Therefore, the inner reflectance of optical elements containing various glass materials with different refractive indices can be suitably reduced. However, since the light-shielding film described in PTL 2 contains many dyes as a component for absorbing stray light guided into the light-shielding film, the resistance to a cleaning liquid is poor. Specifically, there is a problem such that when the cemented lens provided with the light-shielding film is cleaned with a cleaning liquid, such as isopropyl alcohol, the dyes contained in the light-shielding film elute into the cleaning liquid, so that the exchange cycle of the cleaning liquid becomes short to raise the cost.

The invention provides a light-shielding coating material for optical element for forming a light-shielding film for optical element having durability under high temperature and high humidity conditions and resistance to a cleaning liquid, the light-shielding film for optical element, and an optical element containing the light-shielding film.

Solution to Problem

A light-shielding coating material for optical element according to the invention is a light-shielding coating material containing an epoxy resin composition at least containing an epoxy resin, titania fine particles, and a dye and an amine curing agent, in which the equivalent ratio (A/E) of an active hydrogen equivalent weight (A) of the amine curing agent and an epoxy equivalent weight (E) of the epoxy resin and the compounding ratio (A'/E') of the amine curing agent amount (A') and the epoxy resin amount (E') satisfy the following expression 1.

$$1.1 \leq (A'/E')/(A/E) \leq 1.7 \qquad \text{(Expression 1)}$$

A light-shielding coating film for optical element according to the invention is a light-shielding coating film for optical element containing a cured substance at least containing an epoxy resin, titania fine particles, a dye, and an amine curing agent, in which the equivalent ratio (A/E) of an active hydrogen equivalent weight (A) of the amine curing agent and an epoxy equivalent weight (E) of the epoxy resin and the compounding ratio (A'/E') of the amine curing agent amount (A') and the epoxy resin amount (E') satisfy the following expression 1.

$$1.1 \leq (A'/E')/(A/E) \leq 1.7 \qquad \text{(Expression 1)}$$

An optical element according to the invention is an optical element having the light-shielding film.

Advantageous Effects of Invention

The invention can provide a light-shielding coating material for optical element for forming a light-shielding film for optical element having durability under high temperature and high humidity conditions and resistance to a cleaning liquid, the light-shielding film for optical element, and an optical element containing the light-shielding film.

BRIEF DESCRIPTION OF DRAWINGS

FIG. 1 is a schematic view illustrating one embodiment of a light-shielding film for optical element of the invention.

DESCRIPTION OF EMBODIMENT

The purposes of the invention can be achieved by the above-described configuration, and specifically can be achieved according to the following aspect.

A light-shielding coating material for optical element of the invention is used for forming a light-shielding film. In order to achieve sufficient function as a light-shielding film, it is suitable that stray light is guided to the inside of the light-shielding film as much as possible at the interface of the optical element and the light-shielding film, and the guided stray light is sufficiently absorbed in the film. To that end, it is suitable that the refractive index value of the light-shielding film is closer to the refractive index value of materials used for the optical element serving as a base material. In order to absorb the stray light guided to the inside of the light-shielding film, a component which absorbs light is required in the light-shielding film. Furthermore, it is necessary to maintain sufficient adhesiveness with which the light-shielding film does not separate from the lens interface under high temperature and high humidity conditions even when the light-shielding film is heat-treated at a low temperature and reduce the elution of the dye contained in the light-shielding film into the cleaning liquid.

The preset inventors have conducted extensive researches, and, as a result, have found that a light-shielding film is effective which is provided by compounding titania fine particles as a component which adjusts the refractive index, a dye as a component which absorbs stray light guided to the inside, and an amine curing agent as a component which increases the adhesion force and the curing reaction rate of the light-shielding film in an epoxy resin, in which the amine curing agent is excessively compounded in a specific range relative to the equivalent ratio of the active hydrogen equivalent weight of the amine curing agent and the epoxy equivalent weight of the epoxy resin.

(Light-Shielding Coating Material)

A light-shielding coating material for optical element according to the invention is a light-shielding coating material containing an epoxy resin composition at least containing an epoxy resin, titania fine particles, and a dye and an amine curing agent, in which the equivalent ratio (A/E) of the active hydrogen equivalent weight (A) of the amine curing agent and the epoxy equivalent weight (E) of the epoxy resin and the compounding ratio (A'/E') of the amine curing agent amount (A') and the epoxy resin amount (E') satisfy the following expression 1.

$$1.1 \leq (A'/E')/(A/E) \leq 1.7 \quad \text{(Expression 1)}$$

Next, each component contained in the light-shielding coating material of the invention is described.

The epoxy resin composition in the light-shielding coating material of the invention contains an epoxy resin, titania fine particles, a dye, an organic solvent, a dispersing agent, an additive, and the like.

(Epoxy Resin)

As the epoxy resin in the invention, one or two or more types of known epoxy resins can be used in the range where the dispersibility of the titania fine particles, the compatibility with the dye, the curability with the amine curing agent, the stability as a coat, and the adhesiveness with a base material are not impaired. More specifically, a glycidyl ether type epoxy resin, a glycidyl ester type epoxy resin, a glycidyl amine type epoxy resin, linear aliphatic epoxide, alicyclic epoxide, and the like can be used, more suitably a glycidyl ether type epoxy resin can be used, and still more suitably one or two or more types of bisphenol A type epoxy resin can be used. The epoxy resin is suitably a bisphenol A type epoxy resin.

The content of the epoxy resin contained in the epoxy resin composition in the invention is suitably 10 wt % or more and 60 wt % or lower and more suitably 15 wt % or more and 40 wt % or lower relative to the epoxy resin composition. When the content is lower than 10 wt %, the adhesiveness of a coat decreases. Therefore, the content is not suitable. When the content is more than 60 wt %, the optical characteristics deteriorate. Therefore, the content is not suitable.

(Titania Fine Particles)

The titania fine particles in the invention can be suitably used due to the fact that the titania fine particles easily adjust the refractive index of the light-shielding film to a desired refractive index due to a high refractive index of the titania fine particles themselves and a large number of sufficiently pulverized fine particles are marketed at a relatively low cost.

The content of the titania fine particles contained in the epoxy resin composition in the invention is suitably 20 wt % or more and 60 wt % or lower and more suitably 20 wt % or more and 55 wt % or lower relative to the epoxy resin composition. This is because when the content is lower than 20 wt %, the refractive index of the light-shielding film cannot be sufficiently increased and when the content is more than 60 wt %, sufficient film quality as a light-shielding film is not obtained.

The average primary particle diameter of the titania fine particles in the invention is suitably 1 nm or more and 100 nm or lower and more suitably 1 nm or more and 70 nm or lower. When the diameter is lower than 1 nm, the surface area of the fine particles dramatically increases, and the titania fine particles are very likely to aggregate, so that it becomes difficult to suitably disperse the particles. When the diameter is larger than 100 nm, a single particle itself serves as a light scattering source, so that sufficient performance as a light-shielding film cannot be demonstrated. The average primary particle diameter in the invention refers to an equivalent diameter of equal volume sphere in the particles which do not aggregate.

The titania fine particles in the invention can be manufactured by known methods, such as a gaseous phase method and a liquid phase method, insofar as the refractive index and the average primary particle diameter thereof satisfy desired conditions. For example, known methods, such as a method of synthesizing titanium dioxide fine particles by charging metal powder in a flame for burning under an atmosphere at least containing oxygen and a sol-gel method including performing hydrolysis and polycondensation of titanium alkoxide in the presence of a catalyst, are mentioned. Titania is known to have crystal structures, such as a rutile structure and an anatase structure, and shows a higher refractive index as compared with that of an amorphous structure. However, titania can be suitably used irrespective of the crystal shape insofar as a desired refractive index is satisfied.

(Dye)

The dye in the invention is not particularly limited in the range where the dye has absorption in a visible light region and the compatibility with the epoxy resin and the dispersibility of the titania fine particles are not impaired, and known dyes can be used. As the dye, one type dye may be used or a plurality of types of dyes of black, red, yellow, blue, and the like may be used in combination to thereby adjust the absorption wavelength. As the type of the dye, azo dyes with an abundant variety of colors are more suitable. An anthraquinone dye, a phthalocyanine dye, a styrylbenzene dye, a pyrazolone dye, a thiazole dye, a carbonium dye, and an azine dye may be used. Since lightfastness, water resistance, heat resistance, and the like increase, dyes containing metal, such as chromium, cobalt, and copper, are more suitable.

The content of the dye contained in the epoxy resin composition in the invention is 15 wt % or more and 50 wt % or lower, more suitably 15 wt % or more and 40 wt % or lower, and still more suitably 15 wt % or more and 35 wt % or lower relative to the epoxy resin composition. The dye in the invention is contained for the purpose of sufficiently absorbing stray light guided into the light-shielding film. The dye can further control the refractive index and the absorption coefficient in each wavelength. Therefore, desired properties can be satisfied by adjusting the type and the amount of the plurality of types of dyes according to the reflection characteristics of each wavelength.

(Organic Solvent)

The organic solvent of the light-shielding coating material is not particularly limited insofar as the dispersibility of the titania fine particles, the solubility and coatability of the epoxy resin and the dye are satisfied. Specifically, known low polar organic solvents, such as a hydrocarbon solvent and an aromatic solvent, and known polar organic solvents, such as an ether solvent, an ester solvent, a ketone solvent, and an amide solvent, can be selected.

The content of the organic solvent contained in the epoxy resin composition in the invention is 20 wt % or more and 60 wt % or lower and more suitably 20 wt % or more and 55 wt % or lower relative to the epoxy resin composition.

(Dispersing Agent)

With respect to the titania fine particles, the surface of the fine particles may be modified with a surface-modifying agent in order to prevent coarse aggregation and achieve good dispersibility or may be subjected to treatment for increasing the dispersibility with a dispersing agent, a surfactant, and the like. The type and the amount of the surface-modifying agent, the dispersing agent, and the surfactant are not particularly limited insofar as desired dispersibility and the compatibility with the epoxy resin, the dye, and the like are not impaired. Known surface-modifying agents, dispersing agents, and the like, such as alkoxide compounds of silicon, titanium, aluminum, zirconium, and the like chlorides, such as chlorosilane, acid dispersing agents, such as phosphoric acid and carboxylic acid, an amine type, an amide type, an ester type, a ketone type, an ether type, a glycoxyde, an alcohol type, and an acrylic type, can be used singly or in combination of two or more types thereof.

The titania fine particles may further contain components, such as silica and alumina, for the purpose of reducing the photoactivity insofar as desired refractive index and dispersibility are not impaired.

The content of the dispersing agent contained in the epoxy resin composition in the invention is 3 wt % or more and 20 wt % or lower and more suitably 3 wt % or more and 15 wt % or lower relative to the epoxy resin composition.

(Additive)

The light-shielding coating material may further contain additives in the range where the original purposes are not impaired. Mentioned as the additives are substances, such as a plasticizer, a coupling agent, a fire retardant, such as phosphate esters and melamines, surfactants, such as a fatty acid ester surfactant, an antistatic agent, such as alkylsulfonate and glycerin ester of stearic acid, an antioxidant, an antifungal agent, and an antiseptic. These additives may be used singly or in combination of a plurality of types of thereof.

The content of the additives contained in the epoxy resin composition in the invention is 2 wt % or more and 20 wt % or lower and more suitably 2 wt % or more and 15 wt % or lower relative to the epoxy resin composition.

(Amine Curing Agent)

In order to cure the epoxy resin contained in the light-shielding coating material, the light-shielding coating material of the invention contains an amine curing agent. The amine curing agent is not particularly limited insofar as desired characteristics are satisfied, and known curing agents and curing accelerators can be used. Suitably, usable are chain aliphatic polyamine curing agents, such as N,N'-bis(3-aminopropyl)ethylene diamine, 3,3-diaminodipropyl amine, 1,8-diaminooctane, 1,10-diaminodecane, 3,3-diaminodipropyl amine, diethylenetriamine, tetraethylene pentamine, and triethylene tetramine, cycloaliphatic polyamine curing agents, such as 1,4-bis(3-aminopropyl) piperazine, N-(2-aminoethyl)piperazine, N-(2-aminoethyl) morpholine, N-aminoethyl piperazine, isophorone diamine, and 4,4'-methylene bis(2-methylcyclohexaneamine), and aromatic amine curing agents, such as aliphatic aromatic amine, such as 2-(dimethylaminomethyl)phenol, 2,4,6-tris (dimethylaminomethyl)phenol, and m-xylene diamine, 3,3'-diethyl-4,4'-diaminodiphenylmethane, 3,3',5,5'-tetramethyl-4,4'-diaminodiphenylmethane, 3,3',5,5'-tetraethyl-4,4'-diaminodiphenylmethane, 2,4-diaminotoluene, 1,4-phenylenediamine, 1,3-phenylene diamine, diethyltoluene diamine, 3,4-diamino diphenyl ether, 3,4-diamino diphenyl ether, 3,3-diamino diphenyl methane, 3,4-diamino diphenyl methane, 4,4-diamino diphenyl methane, 3,3'-diamino benzidine, orthotolidine, 3,3'-dimethyl-4,4'-diamino diphenyl methane, 3,3'-diethyl-4,4'-diamino diphenyl methane, 2,4-diaminotoluene, 2,6-diaminotoluene, 1,4-phenylene diamine, 1,3-phenylene diamine, and 1,8-diaminonaphthalene.

The amine curing agents suitably at least contain either primary amine or secondary amine or both primary amine and secondary amine. The amine curing agents also suitably at least contain aliphatic amine. The active hydrogen of the amine curing agents refers to a substantial amine equivalent weight. When using these amine curing agents, the compounding is suitably set in the range where the equivalent ratio (A/E) of the active hydrogen equivalent weight (A) of the amine curing agent and the epoxy equivalent weight (E) of the epoxy resin and the compounding ratio (A'/E') of the amine curing agent amount (A') and the epoxy resin amount (E') satisfy the following expression 1.

$$1.1 \leq (A'/E')/(A/E) \leq 1.7 \qquad \text{(Expression 1)}$$

With respect to the light-shielding coating material for forming the light-shielding film of invention, powdery titania fine particles may be directly added to the epoxy resin, followed by dispersion treatment or a slurry in which titania fine particles are suitably dispersed in a solvent may be added to the epoxy resin. The solvent to be used for the slurry is not particularly limited insofar as the solvent can suitably disperse the titania fine particles and can dissolve required components, such as the epoxy resin and the dye. Known low polar organic solvents, such as a hydrocarbon solvent and an aromatic solvent, and known polar organic solvents, such as an ether solvent, an ester solvent, a ketone solvent, and an amide solvent, can be selected. The solvent to be used for the slurry can be removed by evaporation or the like after adding the same to the epoxy resin. However, it is suitable also from the viewpoint of the manufacturing cost to contain the solvent as the constituent component of the light-shielding coating material without removing the solvent as much as possible. To that end, the solvent may be sufficiently removal by evaporation when forming a coat by drying and firing after the application of the coating material to an optical element.

The light-shielding coating material can be produced by mixing, dispersing, and dissolving by known methods. More simply, all the constituent materials are placed in the same vessel, and then mixed, dispersed, and dissolved by stirring with a propeller or the like. The light-shielding coating material can be produced by mixing, dispersing, and dissolving by known dispersion techniques, such as an ultrasonic stirring device, a mixer, a homogenizer, a planetary rotation device, an impact dispersion device, a disk mill, a sand mill, a bead mill, and a ball mill.

(Light-Shielding Film)

Next, the light-shielding film of the invention is described.

The light-shielding film for optical element according to the invention is a light-shielding coating film for optical element containing a cured substance at least containing an epoxy resin, titania fine particles, a dye, and an amine curing agent, in which the equivalent ratio (A/E) of the active hydrogen equivalent weight (A) of the amine curing agent and the epoxy equivalent weight (E) of the epoxy resin and the compounding ratio (A'/E') of the amine curing agent amount (A') and the epoxy resin amount (E') satisfy the following expression 1.

$$1.1 \leq (A'/E')/(A/E) \leq 1.7 \quad \text{(Expression 1)}$$

An embodiment of the light-shielding film of the invention is described in detail below with reference to the drawing as appropriate.

FIG. 1 is a schematic view illustrating one embodiment of the light-shielding film of the invention. As illustrated in FIG. 1, light-shielding films 1 of the invention are coating films formed at rim portions 2a formed with a flat surface located at the rims of an optical lens 2 for optical element, for example. By forming the light-shielding films 1 of the invention at the rim portions 2a, the generation of the inner reflection in the optical lens 2 can be prevented.

The light-shielding film of the invention is formed by heat-treating an epoxy resin. Therefore, the epoxy resin serving as the matrix of the light-shielding film of the invention has a fixed curing reaction rate and a fixed crosslinking density.

When the curing reaction rate is increased by high temperature firing or the like, the crosslinking density of the epoxy resin becomes high and the network structure of the film becomes a dense structure. On the other hand, when the curing reaction rate is low, the crosslinking density of the epoxy resin becomes low and the network structure of the film becomes a rough structure.

When increasing the adhesion force of the light-shielding film, film separation of a cemented lens exposed to high temperature and high humidity can be reduced.

In the light-shielding film of the invention, it is suitable to compound a light-shielding coating material and a curing agent in such a manner that the equivalent ratio (A/E) of the active hydrogen equivalent weight (A) of an amine curing agent and the epoxy equivalent weight (E) of an epoxy resin constituting the light-shielding coating material and the compounding ratio (A'/E') of the amine curing agent amount (A') and the epoxy resin amount (E') satisfy the following expression 1.

$$1.1 \leq (A'/E')/(A/E) \leq 1.7 \quad \text{(Expression 1)}$$

The formation of the light-shielding film in the range mentioned above allows the formation of the network structure in which, when cleaning a cemented lens having the light-shielding film subjected to heat treatment at a low temperature, the elution of the dye contained in the light-shielding film into the cleaning liquid can be sufficiently reduced. When $((A'/E')/(A/E))$ is lower than 1.1, the curing reaction rate and the adhesion force of the light-shielding film subjected to heat treatment at a low temperature do not sufficiently increase, so that elution of the dye and film separation occur. When $((A'/E')/(A/E))$ is higher than 1.7, a lot of unreacted amines remain in the light-shielding film, so that the resistance under high temperature and high humidity conditions decrease.

Due to an increase in the curing reaction rate, a hydroxyl group is generated from the epoxy group in the light-shielding film and the adhesion force at the interface of the light-shielding film and the lens also increases. Therefore, even when the cemented lens having the light-shielding film subjected to heat treatment at a low temperature is exposed to high temperature and high humidity, the film separation can be reduced and both the reduction in the elution of the dye and the reduction in the film separation are achieved.

Accordingly, due to the configuration of the invention, the film becomes dense to thereby achieve the formation of a network structure suitable for confining the dye and also increase the adhesion force of the film.

The light-shielding film of the invention can be formed by applying an epoxy resin composition light-shielding coating material in which an amine curing agent is added to the light-shielding coating material, and uniformly dissolved to an optical element serving as a base material, followed by drying and firing.

Next, each component contained in the light-shielding film of the invention is described.

(Epoxy Resin)

The epoxy resin is the same as the epoxy resin in the light-shielding coating material.

The content of the epoxy resin contained in the light-shielding film of the invention is suitably 15 wt % or more and 50 wt % or lower and more suitably 15 wt % or more and 40 wt % or lower relative to a cured substance at least containing the epoxy resin, titania fine particles, a dye, and an amine curing agent. When the content is lower than 15 wt %, the adhesiveness of the coat decreases. Therefore, the content is not suitable. When the content is larger than 50 wt %, the optical characteristics deteriorate. Therefore, the content is not suitable. The cured substance in the invention is the same as a residual substance obtained when the light-shielding coating material is held at 200° C. for 2 hours.

(Titania Fine Particles)

The titania fine particles are the same as the titania fine particles in the light-shielding coating material.

The content of the titania fine particles contained in the light-shielding film of the invention is suitably 20 wt % or more and 60 wt % or lower and more suitably 20 wt % or more and 55 wt % or lower relative to the cured substance. This is because when the content is lower than 20 wt %, the refractive index of the light-shielding film cannot be sufficiently increased and when the content is more than 60 wt %, a sufficient film quality as the light-shielding film cannot be obtained.

(Dye)

The dye is the same as the dye in the light-shielding coating material.

The content of the dye contained in the light-shielding film of the invention is 15 wt % or more and 50 wt % or lower, more suitably 15 wt % or more and 40 wt % or lower, and still more suitably 15 wt % or more and 35 wt % or lower relative to the cured substance. The dye of the invention is compounded in order to sufficiently absorb stray light guided into the light-shielding film. Since the dye further can control the refractive index and the absorption coefficient in each wavelength, desired properties can be satisfied by adjusting the type and the amount of a plurality of dyes according to the reflection characteristics of each wavelength.

(Other Components)

The light-shielding film of the invention may contain a surface-modifying agent, a dispersing agent, a surfactant, and an additive as other components. These other components are the same as the components in the light-shielding coating material.

The content of the other components contained in the light-shielding film of the invention is 15 wt % or lower and suitably 10 wt % or lower relative to the cured substance.

(Amine Curing Agent)

The amine curing agent is the same as the amine curing agent in the light-shielding coating material.

When using the amine curing agent, the compounding ratio may be set according to the condition where $((A'/E')/(A/E))$ is 1.1 or more and 1.7 or lower.

(Optical Element)

The optical element according to the invention is an optical element having the light-shielding film. The light-shielding film is formed by applying a light-shielding coating material to a region other than an optically effective surface of an optical element serving as a base material, followed by drying and firing.

As a method for applying the light-shielding coating material to the region other than the optically effective surface of the optical element serving as a base material, known methods, such as a dipping method, a spin coating method, a slit coating method, an electrostatic coating method, and coating using coating tools, such as a brush, a sponge, and a bar coater can be variously selected according to a desired coating shape.

As the drying and firing process after the application, various methods can be selected according to the type and the amount of the selected curing agent in the range where desired characteristics are satisfied. The treatment can be performed at suitably room temperature or more and 300° C. or lower, more suitably 40° C. or more and 250° C. or lower, and still more suitably 40° C. or more and 200° C. or lower for suitably 10 minutes or more and 10 hours or lower, more suitably 30 minutes or more and 10 hours or lower, and still more suitably 1 hour or more and 10 hours or lower.

The optical element of the invention has a feature such that the light-shielding film is formed on a non-optically effective surface. The light-shielding film of the invention has a sufficiently low inner reflectance in practical use, durability under high temperature and high humidity conditions in the case where the film is obtained by heat treatment at a low temperature, and resistance to a cleaning liquid. The light-shielding film of the invention is used for optical elements for use in optical apparatuses, such as a camera, binoculars, a microscope, and a semiconductor exposure apparatus. The light-shielding film of the invention can be suitably used because the internally reflected light is sufficiently reduced in practical use and even when the film is obtained by heat treatment at a low temperature, film separation under high temperature and high humidity conditions and elution of the dye contained in the light-shielding film into a cleaning liquid can be reduced.

EXAMPLES

Hereinafter, the invention is more specifically described with reference to Examples and Comparative Examples. The invention is not limited to these Examples at all.

The evaluation in Examples and Comparative Examples of the invention was performed according to the following methods.

(Evaluation of Solvent Resistance)

The solvent resistance of the obtained light-shielding films was evaluated by measuring the transmittance of a cleaning liquid when the dye eluted into the cleaning liquid.

The transmittance (T1) of isopropyl alcohol was measured using QUARTZ CELL (10 mm in length×10 mm in width×45 mm in height) [product name] (manufactured by Fine) with a spectrophotometer U-4000 [product name] (manufactured by Hitachi High-Technologies Corporation).

Next, a light-shielding film was formed on a flat plate glass (φ0 mm, 2 mm in thickness) in such a manner that the film thickness after firing was 2.5 μm, dried at room temperature for 1 hour, and then fired at 80° C. for 2 hours. Thereafter, the flat plate glass on which the light-shielding film was formed was immersed in 10 ml of isopropyl alcohol for 1 hour, thereby producing an immersion liquid. The transmittance (T2) of the immersion liquid was measured by the same method. A value obtained by dividing the transmittance (T2) by the transmittance (T1) was defined as the transmittance when the dye eluted into isopropyl alcohol.

(Evaluation of Film Separation Under High Temperature and High Humidity Conditions)

The evaluation of film separation under high temperature and high humidity conditions of the obtained light-shielding films was performed by the following method.

A light-shielding film was formed on a cemented lens in such a manner that the film thickness after firing was 2.5 μm, dried at room temperature for 1 hour, and then fired at 80° C. for 2 hours. Thereafter, the cemented lens on which the light-shielding film was formed was exposed to an atmosphere of a temperature of 60° C. and a humidity of 90% for 1000 hours. Then, the film separation at the interface of the light-shielding film and the lens was visually observed. With respect to the evaluation of the film separation in Table 1, ○ indicates that the film separation did not occur and x indicates that the film separation occurred.

Example 1

In a stirring vessel, 26 g of a bisphenol A type epoxy resin jER828 [product name] (manufactured by Mitsubishi Chemical Corporation), 108 g of a titania dispersion liquid ND139 [product name] (manufactured by TAYCA CORP., PGME dispersion liquid with a titania concentration of 25 wt %, Average primary particle diameter of 15 nm), 2.8 g of a dye VALIFAST-BLACK 3810 [product name] (manufactured by Orient Chemical Industries Co., Ltd. company), 7.0 g of a dye VALIFAST-RED 3320 [product name] (manufactured by an Orient Chemical Industries Co., Ltd. company), 2.8 g of a dye VALIFAST-YELLOW 3108 [product name] (manufactured by an Orient Chemical Industries Co., Ltd. company), 9.75 g of a dye VALIFAST-BLUE 2620 [product name] (manufactured by an Orient Chemical Industries Co., Ltd. company), and 2.3 g of an antifungal agent SYNTHOL M-100 [product name] (manufactured by Sumika Enviro-Science Co., LTD.) were charged, and then stirred for 20 minutes by a planetary rotation stirrer HM-500 [product name] (manufactured by KEYENCE CORP.), thereby obtaining an epoxy resin composition.

To 7.0 g of the obtained epoxy resin composition, 0.764 g of an amine curing agent EH-551-CH [product name] (manufactured by ADEKA) and 2.3 g of PGMEA (propylene glycol 1-monomethyl ether acetate) (manufactured by Kishida Chemical Co., Ltd.) were added, and then stirred for 3 minutes by a planetary rotation stirrer HM-500 [product name] (manufactured by KEYENCE CORP.).

At this time, the amine curing agent is contained in such a manner that the compounding ratio/equivalent ratio ((A'/E')/(A/E)) is 1.1.

In Example 1, the active hydrogen equivalent weight (A) of the amine curing agent EH-551-CH is 114 and the epoxy equivalent weight (E) of the epoxy resin jER828 is 190. Accordingly, the equivalent ratio (A/E) is 114/190=0.6. The amine curing agent amount (A') is 0.764 g and the epoxy resin amount (E') contained in 7 g of the epoxy resin composition is 7 g×(26 g of epoxy resin/158.65 g of the total amount of epoxy resin composition)=1.147 g. Therefore, the compounding ratio (A'/E') is 0.764 g/1.147 g=0.666. More specifically, the compounding ratio/equivalent ratio ((A'/E')/(A/E)) is 0.666/0.6=1.1.

The obtained light-shielding coating material was applied onto the flat plate glass and the cemented lens described above, dried at room temperature for 1 hour, and then fired in a thermostatic furnace at 80° C. for 2 hours. The evaluation results of the solvent resistance and the film separation under high temperature and high humidity conditions of the obtained light-shielding film are shown in Table 1.

Example 2

In a stirring vessel, 26 g of a bisphenol A type epoxy resin jER828 [product name] (manufactured by Mitsubishi Chemical Corporation), 108 g of a titania dispersion liquid ND139 [product name] (manufactured by TAYCA CORP., PGME dispersion liquid with a titania concentration of 25 wt %, Average primary particle diameter of 15 nm), 2.8 g of a dye VALIFAST-BLACK 3810 [product name] (manufactured by Orient Chemical Industries Co., Ltd. company), 7.0 g of a dye VALIFAST-RED 3320 [product name] (manufactured by an Orient Chemical Industries Co., Ltd. company), 2.8 g of a dye VALIFAST-YELLOW 3108 [product name] (manufactured by an Orient Chemical Industries Co., Ltd. company), 9.75 g of a dye VALIFAST-BLUE 2620 [product name] (manufactured by an Orient Chemical Industries Co., Ltd. company), and 2.3 g of an antifungal agent SYNTHOL M-100 [product name] (manufactured by Sumika Enviro-Science Co., LTD.) were charged, and then stirred for 20 minutes by a planetary rotation stirrer HM-500 [product name] (manufactured by KEYENCE CORP.), thereby obtaining an epoxy resin composition.

To 7.0 g of the obtained epoxy resin composition, 0.163 g of an amine curing agent triethylene tetramine (product name, manufactured by Kishida Chemical Co., Ltd., Active hydrogen equivalent weight: 22.4) containing primary amine and secondary amine and 2.3 g of PGMEA (propylene glycol 1-monomethyl ether acetate) (manufactured by Kishida Chemical Co., Ltd.) were added, and then stirred for 3 minutes by a planetary rotation stirrer HM-500 [product name] (manufactured by KEYENCE CORP.).

At this time, the amine curing agent is contained in such a manner that the compounding ratio/equivalent ratio ((A'/E')/(A/E)) is 1.1.

The obtained light-shielding coating material was applied onto the flat plate glass and the cemented lens described above, dried at room temperature for 1 hour, and then fired in a thermostatic furnace at 80° C. for 2 hours. The evaluation results of the solvent resistance and the film separation under high temperature and high humidity conditions of the obtained light-shielding film are shown in Table 1.

Example 3

In a stirring vessel, 26 g of a bisphenol A type epoxy resin jER828 [product name] (manufactured by Mitsubishi Chemical Corporation), 108 g of a titania dispersion liquid ND139 [product name] (manufactured by TAYCA CORP., PGME dispersion liquid with a titania concentration of 25 wt %, Average primary particle diameter of 15 nm), 2.8 g of a dye VALIFAST-BLACK 3810 [product name] (manufactured by Orient Chemical Industries Co., Ltd. company), 7.0 g of a dye VALIFAST-RED 3320 [product name] (manufactured by an Orient Chemical Industries Co., Ltd. company), 2.8 g of a dye VALIFAST-YELLOW 3108 [product name] (manufactured by an Orient Chemical Industries Co., Ltd. company), 9.75 g of a dye VALIFAST-BLUE 2620 [product name] (manufactured by an Orient Chemical Industries Co., Ltd. company), and 2.3 g of an antifungal agent SYNTHOL M-100 [product name] (manufactured by Sumika Enviro-Science Co., LTD.) were charged, and then stirred for 20 minutes by a planetary rotation stirrer HM-500 [product name] (manufactured by KEYENCE CORP.), thereby obtaining an epoxy resin composition.

To 7.0 g of the obtained epoxy resin composition, 0.191 g of an aliphatic amine curing agent DACH-pt (product name, manufactured by Iwatani Industrial Gases Corp., Active hydrogen equivalent weight: 28.5) and 2.3 g of PGMEA (propylene glycol 1-monomethyl ether acetate) (manufactured by Kishida Chemical Co., Ltd.) were added, and then stirred for 3 minutes by a planetary rotation stirrer HM-500 [product name] (manufactured by KEYENCE CORP.).

At this time, the amine curing agent is contained in such a manner that the compounding ratio/equivalent ratio ((A'/E')/(A/E)) is 1.1.

The obtained light-shielding coating material was applied onto the flat plate glass and the cemented lens described above, dried at room temperature for 1 hour, and then fired in a thermostatic furnace at 80° C. for 2 hours. The evaluation results of the solvent resistance and the film separation under high temperature and high humidity conditions of the obtained light-shielding film are shown in Table 1.

Example 4

In a stirring vessel, 26 g of a bisphenol A type epoxy resin jER828 [product name] (manufactured by Mitsubishi Chemical Corporation), 108 g of a titania dispersion liquid ND139 [product name] (manufactured by TAYCA CORP., PGME dispersion liquid with a titania concentration of 25 wt %, Average primary particle diameter of 15 nm), 2.8 g of a dye VALIFAST-BLACK 3810 [product name] (manufactured by Orient Chemical Industries Co., Ltd. company), 7.0 g of a dye VALIFAST-RED 3320 [product name] (manufactured by an Orient Chemical Industries Co., Ltd. company), 2.8 g of a dye VALIFAST-YELLOW 3108 [product name] (manufactured by an Orient Chemical Industries Co., Ltd. company), 9.75 g of a dye VALIFAST-BLUE 2620 [product name] (manufactured by an Orient Chemical Industries Co., Ltd. company), and 2.3 g of an antifungal agent SYNTHOL M-100 [product name] (manufactured by Sumika Enviro-Science Co., LTD.) were charged, and then stirred for 20 minutes by a planetary rotation stirrer HM-500 [product name] (manufactured by KEYENCE CORP.), thereby obtaining an epoxy resin composition.

To 7.0 g of the obtained epoxy resin composition, 0.400 g of an aliphatic amine curing agent jER113 (product name, manufactured by Mitsubishi Chemical Corporation, Active hydrogen equivalent weight: 60.5) and 2.3 g of PGMEA (propylene glycol 1-monomethyl ether acetate) (manufactured by Kishida Chemical Co., Ltd.) were added, and then stirred for 3 minutes by a planetary rotation stirrer HM-500 [product name] (manufactured by KEYENCE CORP.).

At this time, the amine curing agent is contained in such a manner that the compounding ratio/equivalent ratio ((A'/E')/(A/E)) is 1.1.

The obtained light-shielding coating material was applied onto the flat plate glass and the cemented lens described above, dried at room temperature for 1 hour, and then fired in a thermostatic furnace at 80° C. for 2 hours. The evaluation results of the solvent resistance and the film separation under high temperature and high humidity conditions of the obtained light-shielding film are shown in Table 1.

Example 5

In a stirring vessel, 26 g of a bisphenol A type epoxy resin jER828 [product name] (manufactured by Mitsubishi Chemical Corporation), 108 g of a titania dispersion liquid ND139 [product name] (manufactured by TAYCA CORP., PGME dispersion liquid with a titania concentration of 25 wt %, Average primary particle diameter of 15 nm), 2.8 g of a dye VALIFAST-BLACK 3810 [product name] (manufactured by Orient Chemical Industries Co., Ltd. company), 7.0 g of a dye VALIFAST-RED 3320 [product name] (manufactured by an Orient Chemical Industries Co., Ltd. company), 2.8 g of a dye VALIFAST-YELLOW 3108 [product name] (manufactured by an Orient Chemical Industries Co., Ltd. company), 9.75 g of a dye VALIFAST-BLUE 2620 [product name] (manufactured by an Orient Chemical Industries Co., Ltd. company), and 2.3 g of an antifungal agent SYNTHOL M-100 [product name] (manufactured by Sumika Enviro-Science Co., LTD.) were charged, and then stirred for 20 minutes by a planetary rotation stirrer HM-500 [product name] (manufactured by KEYENCE CORP.), thereby obtaining an epoxy resin composition.

To 7.0 g of the obtained epoxy resin composition, 0.510 g of an aliphatic amine curing agent jER113 (product name, manufactured by Mitsubishi Chemical Corporation, Active hydrogen equivalent weight: 60.5) and 2.3 g of PGMEA (propylene glycol 1-monomethyl ether acetate) (manufactured by Kishida Chemical Co., Ltd.) were added, and then stirred for 3 minutes by a planetary rotation stirrer HM-500 [product name] (manufactured by KEYENCE CORP.).

At this time, the amine curing agent is contained in such a manner that the compounding ratio/equivalent ratio ((A'/E')/(A/E)) is 1.4.

The obtained light-shielding coating material was applied onto the flat plate glass and the cemented lens described above, dried at room temperature for 1 hour, and then fired in a thermostatic furnace at 80° C. for 2 hours. The evaluation results of the solvent resistance and the film separation under high temperature and high humidity conditions of the obtained light-shielding film are shown in Table 1.

Example 6

In a stirring vessel, 26 g of a bisphenol A type epoxy resin jER828 [product name] (manufactured by Mitsubishi Chemical Corporation), 108 g of a titania dispersion liquid ND139 [product name] (manufactured by TAYCA CORP., PGME dispersion liquid with a titania concentration of 25 wt %, Average primary particle diameter of 15 nm), 2.8 g of a dye VALIFAST-BLACK 3810 [product name] (manufactured by Orient Chemical Industries Co., Ltd. company), 7.0 g of a dye VALIFAST-RED 3320 [product name] (manufactured by an Orient Chemical Industries Co., Ltd. company), 2.8 g of a dye VALIFAST-YELLOW 3108 [product name] (manufactured by an Orient Chemical Industries Co., Ltd. company), 9.75 g of a dye VALIFAST-BLUE 2620 [product name] (manufactured by an Orient Chemical Industries Co., Ltd. company), and 2.3 g of an antifungal agent SYNTHOL M-100 [product name] (manufactured by Sumika Enviro-Science Co., LTD.) were charged, and then stirred for 20 minutes by a planetary rotation stirrer HM-500 [product name] (manufactured by KEYENCE CORP.), thereby obtaining an epoxy resin composition.

To 7.0 g of the obtained epoxy resin composition, 0.620 g of an aliphatic amine curing agent jER113 (product name, manufactured by Mitsubishi Chemical Corporation, Active hydrogen equivalent weight: 60.5) and 2.3 g of PGMEA (propylene glycol 1-monomethyl ether acetate) (manufactured by Kishida Chemical Co., Ltd.) were added, and then stirred for 3 minutes by a planetary rotation stirrer HM-500 [product name] (manufactured by KEYENCE CORP.).

At this time, the amine curing agent is contained in such a manner that the compounding ratio/equivalent ratio ((A'/E')/(A/E)) is 1.7.

The obtained light-shielding coating material was applied onto the flat plate glass and the cemented lens described above, dried at room temperature for 1 hour, and then fired in a thermostatic furnace at 80° C. for 2 hours. The evaluation results of the solvent resistance and the film separation under high temperature and high humidity conditions of the obtained light-shielding film are shown in Table 1.

Comparative Example 1

In a stirring vessel, 26 g of a bisphenol A type epoxy resin jER828 [product name] (manufactured by Mitsubishi Chemical Corporation), 108 g of a titania dispersion liquid ND139 [product name] (manufactured by TAYCA CORP., PGME dispersion liquid with a titania concentration of 25 wt %, Average primary particle diameter of 15 nm), 2.8 g of a dye VALIFAST-BLACK 3810 [product name] (manufactured by Orient Chemical Industries Co., Ltd. company), 7.0 g of a dye VALIFAST-RED 3320 [product name] (manufactured by an Orient Chemical Industries Co., Ltd. company), 2.8 g of a dye VALIFAST-YELLOW 3108 [product name] (manufactured by an Orient Chemical Industries Co., Ltd. company), 9.75 g of a dye VALIFAST-BLUE 2620

[product name] (manufactured by an Orient Chemical Industries Co., Ltd. company), and 2.3 g of an antifungal agent SYNTHOL M-100 [product name] (manufactured by Sumika Enviro-Science Co., LTD.) were charged, and then stirred for 20 minutes by a planetary rotation stirrer HM-500 [product name] (manufactured by KEYENCE CORP.), thereby obtaining an epoxy resin composition.

To 7.0 g of the obtained epoxy resin composition, 0.180 g of an aliphatic amine curing agent jER113 (product name, manufactured by Mitsubishi Chemical Corporation, Active hydrogen equivalent weight: 60.5) and 2.3 g of PGMEA (propylene glycol 1-monomethyl ether acetate) (manufactured by Kishida Chemical Co., Ltd.) were added, and then stirred for 3 minutes by a planetary rotation stirrer HM-500 [product name] (manufactured by KEYENCE CORP.).

At this time, the amine curing agent is contained in such a manner that the compounding ratio/equivalent ratio ((A'/E')/(A/E)) is 0.5.

The obtained light-shielding coating material was applied onto the flat plate glass and the cemented lens described above, dried at room temperature for 1 hour, and then fired in a thermostatic furnace at 80° C. for 2 hours. The evaluation results of the solvent resistance and the film separation under high temperature and high humidity conditions of the obtained light-shielding film are shown in Table 1.

Comparative Example 2

In a stirring vessel, 26 g of a bisphenol A type epoxy resin jER828 [product name] (manufactured by Mitsubishi Chemical Corporation), 108 g of a titania dispersion liquid ND139 [product name] (manufactured by TAYCA CORP., PGME dispersion liquid with a titania concentration of 25 wt %, Average primary particle diameter of 15 nm), 2.8 g of a dye VALIFAST-BLACK 3810 [product name] (manufactured by Orient Chemical Industries Co., Ltd. company), 7.0 g of a dye VALIFAST-RED 3320 [product name] (manufactured by an Orient Chemical Industries Co., Ltd. company), 2.8 g of a dye VALIFAST-YELLOW 3108 [product name] (manufactured by an Orient Chemical Industries Co., Ltd. company), 9.75 g of a dye VALIFAST-BLUE 2620 [product name] (manufactured by an Orient Chemical Industries Co., Ltd. company), and 2.3 g of an antifungal agent SYNTHOL M-100 [product name] (manufactured by Sumika Enviro-Science Co., LTD.) were charged, and then stirred for 20 minutes by a planetary rotation stirrer HM-500 [product name] (manufactured by KEYENCE CORP.), thereby obtaining an epoxy resin composition.

To 7.0 g of the obtained epoxy resin composition, 0.290 g of an aliphatic amine curing agent jER113 (product name, manufactured by Mitsubishi Chemical Corporation, Active hydrogen equivalent weight: 60.5) and 2.3 g of PGMEA (propylene glycol 1-monomethyl ether acetate) (manufactured by Kishida Chemical Co., Ltd.) were added, and then stirred for 3 minutes by a planetary rotation stirrer HM-500 [product name] (manufactured by KEYENCE CORP.).

At this time, the amine curing agent is contained in such a manner that the compounding ratio/equivalent ratio ((A'/E')/(A/E)) is 0.8.

The obtained light-shielding coating material was applied onto the flat plate glass and the cemented lens described above, dried at room temperature for 1 hour, and then fired in a thermostatic furnace at 80° C. for 2 hours. The evaluation results of the solvent resistance and the film separation under high temperature and high humidity conditions of the obtained light-shielding film are shown in Table 1.

Comparative Example 3

In a stirring vessel, 26 g of a bisphenol A type epoxy resin jER828 [product name] (manufactured by Mitsubishi Chemical Corporation), 108 g of a titania dispersion liquid ND139 [product name] (manufactured by TAYCA CORP., PGME dispersion liquid with a titania concentration of 25 wt %, Average primary particle diameter of 15 nm), 2.8 g of a dye VALIFAST-BLACK 3810 [product name] (manufactured by Orient Chemical Industries Co., Ltd. company), 7.0 g of a dye VALIFAST-RED 3320 [product name] (manufactured by an Orient Chemical Industries Co., Ltd. company), 2.8 g of a dye VALIFAST-YELLOW 3108 [product name] (manufactured by an Orient Chemical Industries Co., Ltd. company), 9.75 g of a dye VALIFAST-BLUE 2620 [product name] (manufactured by an Orient Chemical Industries Co., Ltd. company), and 2.3 g of an antifungal agent SYNTHOL M-100 [product name] (manufactured by Sumika Enviro-Science Co., LTD.) were charged, and then stirred for 20 minutes by a planetary rotation stirrer HM-500 [product name] (manufactured by KEYENCE CORP.), thereby obtaining an epoxy resin composition.

To 7.0 g of the obtained epoxy resin composition, 0.730 g of an aliphatic amine curing agent jER113 (product name, manufactured by Mitsubishi Chemical Corporation, Active hydrogen equivalent weight: 60.5) and 2.3 g of PGMEA (propylene glycol 1-monomethyl ether acetate) (manufactured by Kishida Chemical Co., Ltd.) were added, and then stirred for 3 minutes by a planetary rotation stirrer HM-500 [product name] (manufactured by KEYENCE CORP.).

At this time, the amine curing agent is contained in such a manner that the compounding ratio/equivalent ratio ((A'/E')/(A/E)) is 2.0.

The obtained light-shielding coating material was applied onto the flat plate glass and the cemented lens described above, dried at room temperature for 1 hour, and then fired in a thermostatic furnace at 80° C. for 2 hours. The evaluation results of the solvent resistance and the film separation under high temperature and high humidity conditions of the obtained light-shielding film are shown in Table 1.

TABLE 1

|  | Equivalent ratio (A/E) | Compounding ratio (A'/E') | Compounding ratio/Equivalent ratio ((A'/E')/(A/E)) | Transmittance (%) | Film separation |
| --- | --- | --- | --- | --- | --- |
| Ex. 1 | 0.60 | 0.666 | 1.1 | 98.3 | ○ |
| Ex. 2 | 0.13 | 0.142 | 1.1 | 99.8 | ○ |
| Ex. 3 | 0.15 | 0.167 | 1.1 | 99.1 | ○ |
| Ex. 4 | 0.32 | 0.349 | 1.1 | 99.2 | ○ |
| Ex. 5 | 0.32 | 0.445 | 1.4 | 99.3 | ○ |
| Ex. 6 | 0.32 | 0.541 | 1.7 | 98.8 | ○ |
| Comp. Ex. 1 | 0.32 | 0.157 | 0.5 | 97.1 | X |

TABLE 1-continued

|  | Equivalent ratio (A/E) | Compounding ratio (A'/E') | Compounding ratio/Equivalent ratio ((A'/E')/(A/E)) | Transmittance (%) | Film separation |
| --- | --- | --- | --- | --- | --- |
| Comp. Ex. 2 | 0.32 | 0.253 | 0.8 | 98.9 | X |
| Comp. Ex. 3 | 0.32 | 0.636 | 2.0 | 97.6 | ○ |

In the evaluation of the solvent resistance, the transmittance of the immersion liquid when the dye eluted from the light-shielding film into the immersion liquid, and the coloring of the isopropyl alcohol can be visually observed was 98% or lower.

From the results of Table 1, it was confirmed from all Examples that, in the light-shielding films formed by compounding amine curing agents in the range where the compounding ratio/equivalent ratio ((A'/E')/(A/E)) was 1.1 or more and 1.7 or lower, the dye elution and the film separation are reduced.

It was confirmed from Comparative Examples 1 and 2 that, in the light-shielding films formed by compounding amine curing agents in the range where the compounding ratio/equivalent ratio ((A'/E')/(A/E)) was lower than 1.1, the film separation was confirmed.

It was confirmed from Comparative Example 3 that, in the light-shielding film formed by compounding an amine curing agent in the range where the compounding ratio/equivalent ratio ((A'/E')/(A/E)) was higher than 1.7, the dye elution increased.

Therefore, it is shown that, by compounding amine curing agents in the range where the compounding ratio/equivalent ratio ((A'/E')/(A/E)) is 1.1 or more and 1.7 or lower, the dye elution and the film separation can be reduced, so that a light-shielding film of sufficient film quality in practical use and an optical element containing the same are obtained.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-034379, filed Feb. 20, 2012, which is hereby incorporated by reference herein in its entirety.

INDUSTRIAL APPLICABILITY

The light-shielding film of the invention can be used for light-shielding films of optical elements for use in optical apparatuses, such as a camera, binoculars, a microscope, and a semiconductor exposure apparatus.

REFERENCE SIGNS LIST

1 Light-shielding film
2 Optical lens
2a Rim surface

The invention claimed is:

1. A light-shielding film for an optical element comprising:
a substance at least containing an epoxy resin, titania fine particles, a dye, and an amine curing agent,
wherein a content of the titania fine particles contained in the substance is 20 weight percent or more and 60 weight percent or less with respect to a total weight of the substance,
wherein an equivalent ratio (A/E) of an active hydrogen equivalent weight (A) of the amine curing agent and an epoxy equivalent weight (E) of the epoxy resin and a compounding ratio (A'/E') of an amine curing agent amount (A') and an epoxy resin amount (E') satisfy the following expressions 1, 2, and 3:

$1.1 \leq (A'/E')/(A/E) \leq 1.4$ (Expression 1)

$0.13 \leq (A/E) \leq 0.32$ (Expression 2)

$0.142 \leq (A'/E') \leq 0.445$, and (Expression 3)

wherein the amine curing agent at least contains aliphatic amine.

2. The light-shielding film according to claim 1, wherein the epoxy resin is a bisphenol A type epoxy resin.

3. An optical element, comprising the light-shielding film according to claim 1.

4. The light-shielding film according to claim 1, wherein a transmittance of the light-shielding film is 99.1% or higher and 99.8% or lower.

5. A light-shielding coating material for an optical element comprising:
an epoxy resin composition at least containing an epoxy resin, titania fine particles, and a dye; and
an amine curing agent,
wherein a content of the titania fine particles contained in the epoxy resin composition is 20 weight percent or more and 60 weight percent or less with respect to a total weight of the epoxy resin composition,
wherein an equivalent ratio (A/E) of an active hydrogen equivalent weight (A) of the amine curing agent and an epoxy equivalent weight (E) of the epoxy resin and a compounding ratio (A'/E') of an amine curing agent amount (A') and an epoxy resin amount (E') satisfy the following expressions 1, 2, and 3:

$1.1 \leq (A'/E')/(A/E) \leq 1.4$ (Expression 1)

$0.13 \leq (A/E) \leq 0.32$ (Expression 2)

$0.142 \leq (A'/E') \leq 0.445$, and (Expression 3)

wherein the amine curing agent at least contains aliphatic amine.

* * * * *